United States Patent [19]
Fukaya et al.

[11] Patent Number: 6,001,757
[45] Date of Patent: Dec. 14, 1999

[54] HARD SINTERED BODY FOR TOOL

[75] Inventors: Tomohiro Fukaya; Tetsuo Nakai, both of Hyogo, Japan

[73] Assignee: Sumitomo Electric Industries, Ltd., Osaka, Japan

[21] Appl. No.: 08/941,454

[22] Filed: Sep. 30, 1997

[30] Foreign Application Priority Data

Oct. 4, 1996 [JP] Japan ................................. 8-264529

[51] Int. Cl.$^6$ .............................................. C04B 35/5835
[52] U.S. Cl. ......................... 501/96.4; 501/87; 501/96.1; 501/96.3; 264/668
[58] Field of Search ........................... 501/96.9, 87, 96.3, 501/96.1; 264/668

[56] References Cited

U.S. PATENT DOCUMENTS

| | | | |
|---|---|---|---|
| 4,334,928 | 6/1982 | Hara et al. | 75/238 |
| 5,092,920 | 3/1992 | Nakai et al. | 501/96.4 |
| 5,200,372 | 4/1993 | Kuroyama et al. | 501/96.4 |
| 5,288,297 | 2/1994 | Ringwood | 501/96.4 |
| 5,326,380 | 7/1994 | Yao et al. | 501/96.4 |
| 5,328,875 | 7/1994 | Ueda et al. | 501/87 |
| 5,466,642 | 11/1995 | Tajima et al. | 501/96.4 |
| 5,569,862 | 10/1996 | Kuroyama et al. | 501/96.4 |

FOREIGN PATENT DOCUMENTS

| | | |
|---|---|---|
| 0598140 | 5/1994 | European Pat. Off. . |
| 2375155 | 7/1978 | France . |
| 53-077811 | 7/1978 | Japan . |
| 6-279912 | 10/1994 | Japan . |

*Primary Examiner*—Karl Group
*Attorney, Agent, or Firm*—W. F. Fasse; W. G. Fasse

[57] ABSTRACT

A hard sintered body for a tool contains 25 to 47 vol. % of cBN, 40 to 70 vol. % and especially less than 45 vol. % in total of a carbo-nitride, and a boride of Ti, and 2 to 20 vol. % in total of a boride and a nitride of Al. In the carbo-nitride of Ti, the ratio of carbon to nitrogen is in the range of 60:40 to 30:70. In this hard sintered body, cBN particles are bonded to each other through binder phases. The obtained hard sintered body for a tool is excellent in wear resistance and chipping resistance for high-speed cutting of hardened steel.

21 Claims, 1 Drawing Sheet

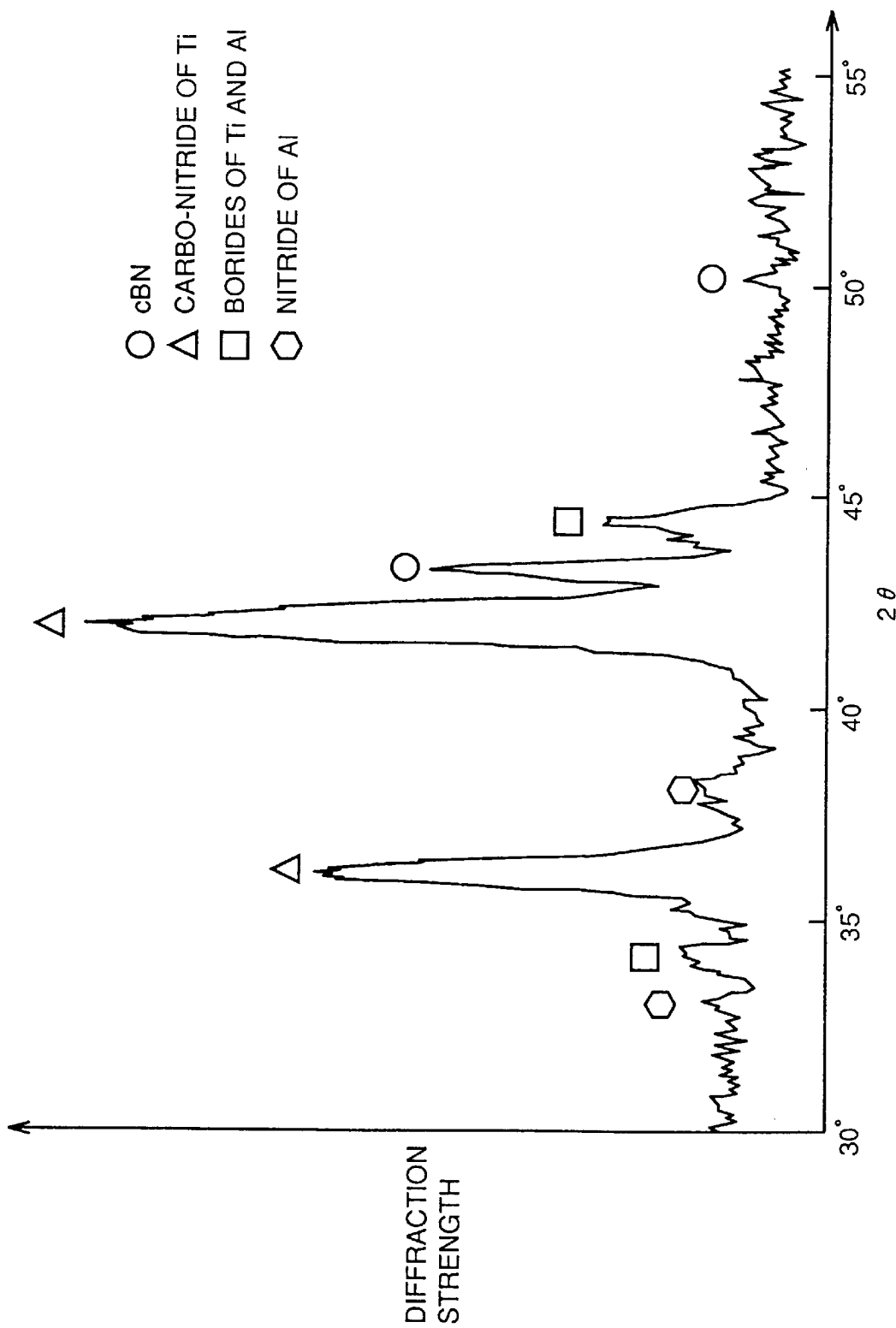

HARD SINTERED BODY FOR TOOL

BACKGROUND OF THE INVENTION

1. Field of the Invention

The present invention relates to a hard sintered body for a tool employing cubic boron nitride (hereinafter referred to as cBN).

2. Description of the Background Art

In general, cBN is widely known as the hardest material following diamond. Sintered bodies of cBN, having lower reactivity with ferrous materials as compared with diamond, are applied to various cutting tools.

Japanese Patent Laying-Open No. 53-77811 (1978) discloses examples of such cBN sintered bodies. This Patent Publication discloses a sintered body consisting of a material containing 80 to 40% of cBN in volume ratio and a rest or remainder mainly composed of a carbide, a nitride, a boride or a silicide of a transition metal belonging to the group IVa, VA or VIa of the periodic table or a mixture or a mutual solid solution compound thereof, and a sintered body prepared by adding Al and/or Si to this material.

However, a tool prepared from either sintered body disclosed in Japanese Patent Laying-Open No. 53-77811 is remarkably worn or abruptly chipped when used for high-speed working of hardened steel, for example.

The tool is worn conceivably because the temperature of its cutting edge is increased during high-speed cutting of hardened steel which thermally deteriorates binders or cause cBN particles to drop out Further, the tool is abruptly chipped conceivably because the binders are thermally deteriorated and reduced in holding power for the cBN particles.

SUMMARY OF THE INVENTION

The present invention has been proposed in order to solve the aforementioned problems. -An object of the present invention is to provide a hard sintered body for a tool which is excellent in wear resistance as well as in chipping resistance for avoiding abrupt chipping in high-speed cutting of hardened steel.

The hard sintered body for a tool according to the present invention contains 25 to 47 vol. % of cBN, 40 to 70 vol. % in total of a carbo-nitride, in which the atomic ratio of carbon to nitrogen is 60:40 to 30:70, and a boride of Ti, and 2 to 20 vol. % in total of a boride and a nitride of Al. In this hard sintered body, cBN particles are bonded to each other through binder phases, In a particular embodiment the sintered body contains less than 45 vol. %, and more particularly less than 40 vol. %, of cBn.

The sintered body according to the present invention contains cBN particles as hereinabove described, and can maintain its hardness and strength at high levels. Further, the carbo-nitride and the boride of Ti contained in the inventive sintered body serve as binder phases strongly bonding the cBN particles with each other, and improve wear resistance of the sintered body due to excellent heat resistance and low reactivity with iron. In addition, the nitride and the boride of Al serve as binder phases strongly bonding the cBN particles with each other. The inventors have made deep study for attaining the aforementioned object, to succeed in improving wear resistance and chipping resistance of the sintered body under conditions that increase a cutting edge temperature during high-speed cutting of hardened steel or the like by optimizing the combination of the contents of cBN, the carbo-nitride and the boride of Ti and the nitride and the boride of Al having the aforementioned functions and the aforementioned ratio of carbon to nitrogen in the carbo-nitride of Ti thereby increasing heat resistance of the binders and bonding strength of the cBN particles.

The sintered body may contain alumina, WC, a transition metal/element such as a ferrous metal or W belonging to the group IVa, Va or VIa of the periodic table, and/or oxygen as unavoidable impurities. The inventive sintered body is prepared by sintering fine particles of cBN and binders. Surfaces of such fine particles inevitably adsorb oxygen, and the adsorbed oxygen is dissolved in the binder phases such as the carbo-nitride of Ti or bonded with Al having high reactivity with oxygen to form alumina remaining in the sintered body. However, the performance of the sintered body is not remarkably deteriorated by such presence of oxygen. While the sintered body may contain a transition metal such as a ferrous metal or W belonging to the group IVa, Va or VIa of the periodic table as an impurity from raw material powder or WC as an impurity resulting from a mixing step, its performance is not remarkably deteriorated by the presence of such an impurity.

As hereinabove described, the cBN content in the inventive sintered body is 25 to 47 vol. % or particularly less than 45 vol. % and even more particularly less than 40 vol. %. If the cBN content is less than 25 vol. %, the sintered body is reduced in hardness, strength and chipping resistance, leading to abrupt chipping of a tool prepared from the sintered body. If the cBN content exceeds 47 vol. %, on the other hand, the quantity of the binders for improving wear resistance is reduced, to reduce the wear resistance of the sintered body.

As hereinabove described, further, the total content of the carbo-nitride and the boride of Ti must be 40 to 70 vol. %, the atomic ratio of carbon to nitrogen in the carbo-nitride of Ti must be 60:40 to 30:70, and the total content of the boride and the nitride of Al must be 2 to 20 vol. %.

If the total contents of the carbo-nitride and the boride of Ti and the boride and the nitride of Al serving as binder phases are less than 40 vol. % and 2 vol. % respectively, bonding strength of the particles forming the sintered body becomes insufficient, to reduce the strength of the sintered body. If the total content of the carbo-nitride and the boride of Ti exceeds 70 vol. %, on the other hand, the cBN content is reduced, to reduce the hardness and the strength of the sintered body.

If the carbo-nitride of Ti contains carbon in excess of the aforementioned range, the toughness is reduced and the bonding strength between the carbo-nitride and the cBN particles is weakened to reduce the chipping resistance, although heat resistance of the binder phases is improved. If the carbo-nitride of Ti contains nitrogen in excess of the aforementioned range, on the other hand, the heat resistance of the binder phases is reduced, to result in insufficient wear resistance.

The boride of Al is fragile as compared with the remaining binder phase compounds, while the nitride of Al is inferior in heat resistance. If the total content of the boride and the nitride of Al exceeds 20 vol. %, therefore, the strength, heat resistance, chipping resistance and wear resistance of the sintered body are reduced.

The aforementioned hard sintered body for a tool is preferably obtained by sintering the aforementioned cBN, at least one or two binder powder materials selected from a group consisting of a carbide, a nitride, a carbo-nitride and a boride of Ti, and at least one or two binder powder materials selected from a group consisting of Al, an alloy of Al and Ti, a nitride of Al, a nitride of Ti and Al and a boride of Al under a very high pressure of at least 4 GPa and a temperature of at least 1200° C.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 1 illustrates a result of X-ray analysis of a sintered body sample No. 2 in Table 1.

DESCRIPTION OF THE PREFERRED EMBODIMENTS

Examples of the present invention are now described with reference to Tables 1 to 3 and FIG. 1.

(EXAMPLE 1)

Sintered bodies having compositions shown in Table 1 were prepared by sintering cBN, at least one or two binder powder materials selected from a group consisting of a carbide, a nitride, a carbo-nitride and a boride of Ti, and at least one or two binder powder materials selected from a group consisting of Al, an alloy of Al and Ti, a nitride of Al, a nitride of Ti and Al and a boride of Al under a very high pressure of 4.5 GPa and a temperature of 1300° C. FIG. 1 shows a result of X-ray analysis (Rad. CuKa 1) of the sintered body of sample No. 2. Then, tools were prepared from these sintered bodies for cutting carburized and quenched chromium steel workpieces (SCr 420) having a hardness of HRC 60, in hardness for 30 minutes under conditions of a cutting speed of 200 m/min., a feed rate of 0.1 mm/rev., and a depth of cut of 0.1 mm in wet cutting, and flank wear widths of the tools were measured.

TABLE 1

| No. | cBN Content (vol. %) | Carbo-Nitride and Boride of Ti (vol. %) | Atomic Ratio of Carbon to Nitrogen in Carbo-Nitride of Ti | Nitride and Boride of Al (vol. %) | Flank Wear Width of Tool (mm) |
|---|---|---|---|---|---|
| 1 | 44 | 48 | 52:48 | 8 | 0.092 |
| 2 | 31 | 58 | 50:50 | 11 | 0.088 |
| 3 | 21 | 64 | 55:45 | 15 | chipped in 22 min. |
| 4 | 50 | 44 | 45:55 | 6 | 0.232 |

It is understood from Table 1 that the tools prepared from the samples Nos. 3 and 4 having cBN contents of 21 vol. % and 50 vol. % were chipped and remarkably worn as compared with the remaining tools respectively. Thus, it is inferred that frank wear width of the tool can be suppressed to the minimum when the cBN content is 25 vol. % to 47 vol. %. Referring to Table 1, underlined values are out of the scope of the present invention. This also applies to Tables 2 and 3.

(EXAMPLE 2)

Sintered bodies having compositions shown in Table 2 prepared by sintering cBN, at least one or two binder powder materials selected from a group consisting of a carbide, a nitride, a carbo-nitride and a boride of Ti, and at least one or two binder powder materials selected from a group consisting of Al, an alloy of Al and Ti, a nitride of Al, a nitride of Ti and Al and a boride of Al under a very high pressure of 5 GPa and a temperature of 1500° C. Then, tools were prepared from these sintered bodies for cutting carburized and quenched chromium molybdenum workpieces (SCM 415) having a hardness of HRC 62 for 40 minutes under conditions of a cutting speed of 220 m/min., a feed rate of 0.08 mm/rev., and a depth of cut of 0.15 mm in dry cutting, and flank wear widths of the tools were measured.

TABLE 2

| No. | cBN Content (vol. %) | Carbo-Nitride and Boride of Ti (vol. %) | Atomic Ratio of Carbon to Nitrogen in Carbo-Nitride of Ti | Nitride and Boride of Al (vol. %) | Flank Wear Width of Tool (mm) |
|---|---|---|---|---|---|
| 5 | 45 | 45 | 58:42 | 10 | 0.092 |
| 6 | 27 | 57 | 33:67 | 16 | 0.088 |
| 7 | 45 | 37 | 49:51 | 18 | 0.210 |
| 8 | 26 | 71 | 35:65 | 3 | chipped in 22 min. |
| 9 | 27 | 62 | 75:25 | 11 | chipped in 25 min. |
| 10 | 39 | 47 | 20:80 | 14 | 0.253 |

It is understood from Table 2 that the tools prepared from the samples Nos. 7 and 8 containing 37 vol. % and 71 vol. % in total of carbo-nitrides and borides of Ti were remarkably worn and chipped respectively. It is also understood that the tools prepared from the samples Nos. 9 and 10 containing carbon and nitrogen in the atomic ratios 75:25 and 20:80 in carbo-nitrides of Ti were chipped and remarkably worn respectively.

Thus, it is inferred that flank wear width of the tool can be suppressed to the minimum when the total content of the carbo-nitride and the boride of Ti is 40 to 70 vol. % and the atomic ratio of carbon to nitrogen in the carbo-nitride of Ti is 60:40 to 30:70.

(EXAMPLE 3)

Sintered bodies having compositions shown in Table 3 were prepared similarly to Example 2. Then, tools were prepared from these sintered bodies for cutting hardened alloy tool steel workpieces (SKD 11) having a hardness of HRC 63 for 20 minutes under conditions of a cutting speed of 180 m/min., a feed rate of 0.06 mm/rev., and a depth of cut of 0.1 mm in wet cutting, and flank wear widths of these tools were measured.

TABLE 3

| No. | cBN Content (vol. %) | Carbo-Nitride and Boride of Ti (vol. %) | Atomic Ratio of Carbon to Nitrogen in Carbo-Nitride of Ti | Nitride and Boride of Al (vol. %) | Flank Wear Width of Tool (mm) |
|---|---|---|---|---|---|
| 11 | 39 | 51 | 35:65 | 10 | 0.098 |
| 12 | 29 | 53 | 53:47 | 18 | 0.091 |
| 13 | 34 | 65 | 57:43 | 1 | chipped in 15 min. |
| 14 | 29 | 47 | 58:42 | 24 | 0.298 |

It is understood from Table 3 that the tools prepared from the samples Nos. 13 and 14 containing 1 vol. % and 24 vol. % in total of nitrides and borides of Al were chipped and remarkably worn as compared with the remaining tools respectively.

Thus, it is inferred that flank wear width of the tool can be suppressed to the minimum when the total content of the nitride and the boride of Al is 2 to 20 vol. %.

As hereinabove described, it is possible to obtain a hard sintered body for a tool which is excellent in wear resistance and chipping resistance in high-speed cutting of hardened steel by properly adjusting the contents of cBN, a carbo-nitride and a boride of Ti, and a nitride and a boride of Al in accordance with the present invention.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A hard sintered body for a tool containing at least 25 and less than 40 vol. % of cubic boron nitride, 40 to 70 vol. % in total of a carbo-nitride and a boride of Ti, and 2 to 20 vol. % in total of a boride and a nitride of Al, wherein said carbo-nitride of Ti contains carbon and nitrogen with an atomic ratio of said carbon relative to said nitrogen in said carbo-nitride of Ti being in a range from 60:40 to 30:70, and wherein said hard sintered body comprises particles of said cubic boron nitride that are bonded to each other through binder phases of said carbo-nitride and said boride of Ti and said boride and said nitride of Al.

2. The hard sintered body for a tool in accordance with claim 1, being obtained by preparing a mixed powder comprising said cubic boron nitride, at least one first binder powder material selected from a first group consisting of a carbide of Ti, a nitride of Ti, a carbo-nitride of Ti, and a boride of Ti, and at least one second binder powder material selected from a second group consisting of Al, an alloy of Al and Ti, a nitride of Al, a nitride of Ti and Al, and a boride of Al, and then sintering said mixed powder under a pressure of at least 4 GPa and a temperature of at least 1200° C.

3. The hard sintered body for a tool in accordance with claim 2, wherein said mixed powder further comprises another binder powder material that is selected from said first group and that is different from said first binder powder material.

4. The hard sintered body for a tool in accordance with claim 3, wherein said mixed powder further comprises a further binder powder material that is selected from said second group and that is different from said second binder powder material.

5. The hard sintered body for a tool in accordance with claim 2, wherein said mixed powder further comprises a further binder powder material that is selected from said second group and that is different from said second binder powder material.

6. The hard sintered body for a tool in accordance with claim 1, containing at least 26 of said cubic boron nitride.

7. The hard sintered body for a tool in accordance with claim 1, containing not more than 39 vol. % of said cubic boron nitride.

8. The hard sintered body for a tool in accordance with claim 7, containing at least 29 vol. % of said cubic boron nitride.

9. The hard sintered body for a tool in accordance with claim 1, containing 44 to 65 vol. % in total of said carbo-nitride and said boride of Ti.

10. The hard sintered body for a tool in accordance with claim 9, containing not more than 62 vol. % in total of said carbo-nitride and said boride of Ti.

11. The hard sintered body for a tool in accordance with claim 9, containing at least 47 vol. % in total of said carbo-nitride and said boride of Ti.

12. The hard sintered body for a tool in accordance with claim 9, wherein said atomic ratio of said carbon relative to said nitrogen in said carbo-nitride of Ti is in a range from 58:42 to 33:67.

13. The hard sintered body for a tool in accordance with claim 12, wherein said atomic ratio is in a range from 58:42 to 35:65.

14. The hard sintered body for a tool in accordance with claim 12, wherein said atomic ratio is in a range from 55:45 to 33:67.

15. The hard sintered body for a tool in accordance with claim 12, containing 3 to 18 vol. % in total of said boride and said nitride of Al.

16. The hard sintered body for a tool in accordance with claim 12, containing 6 to 16 vol. % in total of said boride and said nitride of Al.

17. The hard sintered body for a tool in accordance with claim 1, essentially consisting of said cubic boron nitride, said carbo-nitride and said boride of Ti, said boride and said nitride of Al, and unavoidable impurities.

18. A method of making the hard sintered body according to claim 1, comprising a step of preparing a mixed powder containing said cubic boron nitride, at least one first binder powder material selected from a first group consisting of a carbide of Ti, a nitride of Ti, a carbo-nitride of Ti, and a boride of Ti, and at least one second binder powder material selected from a second group consisting of Al, an alloy of Al and Ti, a nitride of Al, a nitride of Ti and Al, and a boride of Al, and then a step of sintering said mixed powder under a pressure of at least 4 GPa and a temperature of at least 1200° C.

19. The method according to claim 18, wherein said step of preparing said mixed powder comprises mixing said cubic boron nitride, at least two different ones of said first binder powder material and at least two different ones of said second binder powder material.

20. The method according to claim 18, wherein said step of sintering said mixed powder is carried out at a pressure of at least 4.5 GPa and a temperature of at least 1300° C.

21. The method according to claim 20, wherein said step of sintering said mixed powder is carried out at a pressure of at least 5 GPa and a temperature of at least 1500° C.

* * * * *

UNITED STATES PATENT AND TRADEMARK OFFICE
CERTIFICATE OF CORRECTION

PATENT NO. : 6,001,757
DATED : Dec. 14, 1999
INVENTOR(S) : Fukaya et al.

It is certified that error appears in the above-identified patent and that said Letters Patent is hereby corrected as shown below:

Title Page: under [57] "ABSTRACT",
    line 1, before "of", insert --and especially less than 45 vol.%--
    line 2, after "70 vol.%", delete "and especially less than 45 vol.%".

Col. 1, line 29, after "steel", insert --,--, after "or", replace "cause" by --causes--;
    line 30, after "out", insert --.--;
    line 50, after "of", replace "cBn" by --cBN--.

Col. 2, line 2, after "Ti", insert --,--.

Col. 3, line 32, after "60", delete ",".

Signed and Sealed this

Twentieth Day of June, 2000

Attest:

Q. TODD DICKINSON

*Attesting Officer*          *Director of Patents and Trademarks*